US006823062B2

(12) United States Patent
Kepley

(10) Patent No.: US 6,823,062 B2
(45) Date of Patent: Nov. 23, 2004

(54) ARRANGEMENT FOR PREDICTING CALL-CENTER STATUS IN A NETWORK CALL-ROUTING SYSTEM

(75) Inventor: Garry Duane Kepley, Boulder, CO (US)

(73) Assignee: Avaya Technology Corp, Basking Ridge, NJ (US)

( * ) Notice: Subject to any disclaimer, the term of this patent is extended or adjusted under 35 U.S.C. 154(b) by 317 days.

(21) Appl. No.: 10/179,936

(22) Filed: Jun. 19, 2002

(65) Prior Publication Data

US 2003/0235290 A1 Dec. 25, 2003

(51) Int. Cl.$^7$ ............................................. H04M 3/00
(52) U.S. Cl. .......................... 379/266.06; 379/266.08; 379/266.04; 379/265.08
(58) Field of Search ..................... 379/265.01, 265.02, 379/265.08, 266.03, 266.04, 266.06, 266.08

(56) References Cited

U.S. PATENT DOCUMENTS

| | | | |
|---|---|---|---|
| 5,291,550 A | 3/1994 | Levy et al. ................. 379/242 |
| 5,506,898 A | 4/1996 | Costantini et al. .......... 379/266 |
| 5,754,639 A | 5/1998 | Flockhart et al. ........... 379/221 |
| 5,926,538 A | 7/1999 | Deryugin et al. ........... 379/265 |
| 6,104,801 A | 8/2000 | Miloslavsky ................ 379/219 |
| 6,157,655 A | 12/2000 | Shtivelman ................. 370/412 |
| 6,229,888 B1 | 5/2001 | Miloslavsky ................ 379/265 |
| 6,295,353 B1 | 9/2001 | Flockhart et al. ........... 379/265 |
| 6,298,130 B1 | 10/2001 | Galvin ........................ 379/219 |

Primary Examiner—Ahmad F. Matar
Assistant Examiner—Hector Agdeppa
(74) Attorney, Agent, or Firm—David Volejnicek

(57) ABSTRACT

A router routes calls to a network of call centers based on estimated call in-queue wait times (EWTs). The router periodically polls all call centers for the EWT and average advance time (AAT) of each queue, and increments each received EWT by a product of the AAT and the number of calls sent to that queue during the network delay time. Between polls, each time that an AAT period expires, its corresponding EWT is decremented by the AAT (but not below zero). When a call is received for processing by a skill/split, the router sends it to the skill/split queue that presently has the shortest EWT, and increments that EWT by the corresponding AAT.

20 Claims, 4 Drawing Sheets

ARRANGEMENT FOR PREDICTING CALL-CENTER STATUS IN A NETWORK CALL-ROUTING SYSTEM

TECHNICAL FIELD

This invention relates to network communication-routing systems.

BACKGROUND OF THE INVENTION

A network communication-routing system, also referred to as a call router, controls the routing of incoming communications (e.g., calls) to a private (e.g., a company's) network of customer care centers, also known as call centers. One of the principal objectives of a network call-routing system is to route each individual call to the call center in the network which presently offers the shortest call-answer waiting time, i.e., to distribute calls across all call centers evenly from the viewpoint of call-waiting time. In order to achieve this objective, the network call-routing system must obtain status information from each of the call centers in the network on a continuing basis.

There are two commonly-used schemes for sending status updates to a network call-routing system: periodic updates, and event-driven updates. But periodic updates of status are almost never timely. No matter how frequently the updates are sent, there is always a likelihood that a routing decision will use incorrect, out-of-date, status information. And while event-driven updates are much more timely, they require excessive bandwidth and processing time for large call-volume applications. For example: it is not uncommon for as many as 10 update-triggering events to occur per second in a single split on a single busy switch. Furthermore, there is always a delay between when an update is determined and sent at one end and received and used at the other end. Therefore, neither scheme is very efficient or effective in all call-center scenarios, and both have the problem of requiring excessive bandwidth or processing time to achieve an acceptable level of accuracy of routing decisions. Moreover, neither scheme has any way of dealing with a temporary loss of updating capability.

U.S. Pat. No. 5,926,538 discloses a method for managing loading of a plurality of call centers in a network wherein real-time loading information is not available during certain times for one or more of the call centers. The method involves updating a previous, known, status of a call center by using historical data and statistical modeling of call behavior to estimate or predict the present loading of the call center. This statistical method relies principally on knowing the numbers and status of agents, the average call-handling time, the time since the last update, and the numbers of answered and completed calls, for the call center whose status is to be estimated. The method is complex, requires a lot of information, and its accuracy is suspect.

SUMMARY OF THE INVENTION

This invention is directed to solving these and other problems and disadvantages of the art. Generally according to the invention, a plurality of work queues (e.g., call queues in a plurality of call centers) are managed as follows: For each work queue, an expected wait time (EWT) and an average advance time (AAT) are obtained, and the EWT is then decremented by the AAT upon each expiration of the AAT. Preferably, new (current) EWT and AAT for each work queue are obtained periodically. The EWT is never decremented to a negative value. A work item (e.g., a call received for processing) is caused to be enqueued in the one of the work queues that presently has the lowest EWT, and the EWT of that one work queue is incremented by its AAT. The current EWT of each work queue is thus advantageously estimated during the periods between obtaining the true EWT values in a straightforward and easy-to-implement manner. The technique is quite effective in estimating the true EWT, and therefore the true EWT does not have to be obtained relatively often. Hence, the polling rate can be reduced from seconds to tens of seconds or even minutes, yet still produce good results. Because polling need not be done frequently, the system can continue to operate well even when polling ability is lost for a period of time. The accuracy of the technique may advantageously be increased by adjusting the value of the EWT received from each work queue for effects of the network delay time. This is illustratively done by incrementing every received EWT by the product of the corresponding AAT and the number of work items that were enqueued in (sent to) the work queue since the work queue sent the just-received EWT and AAT.

While the invention has been characterized in terms of method, it also encompasses apparatus that performs the method. The apparatus preferably includes an effector—any entity that effects the corresponding step, unlike a means—for each step. The invention further encompasses any computer-readable medium containing instructions which, when executed in a computer, cause the computer to perform the method steps.

BRIEF DESCRIPTION OF THE DRAWING

These and other features and advantages of the invention will become more apparent from the following description of an illustrative embodiment of the invention considered together with the drawing wherein.

DETAILED DESCRIPTION

Figure 1:
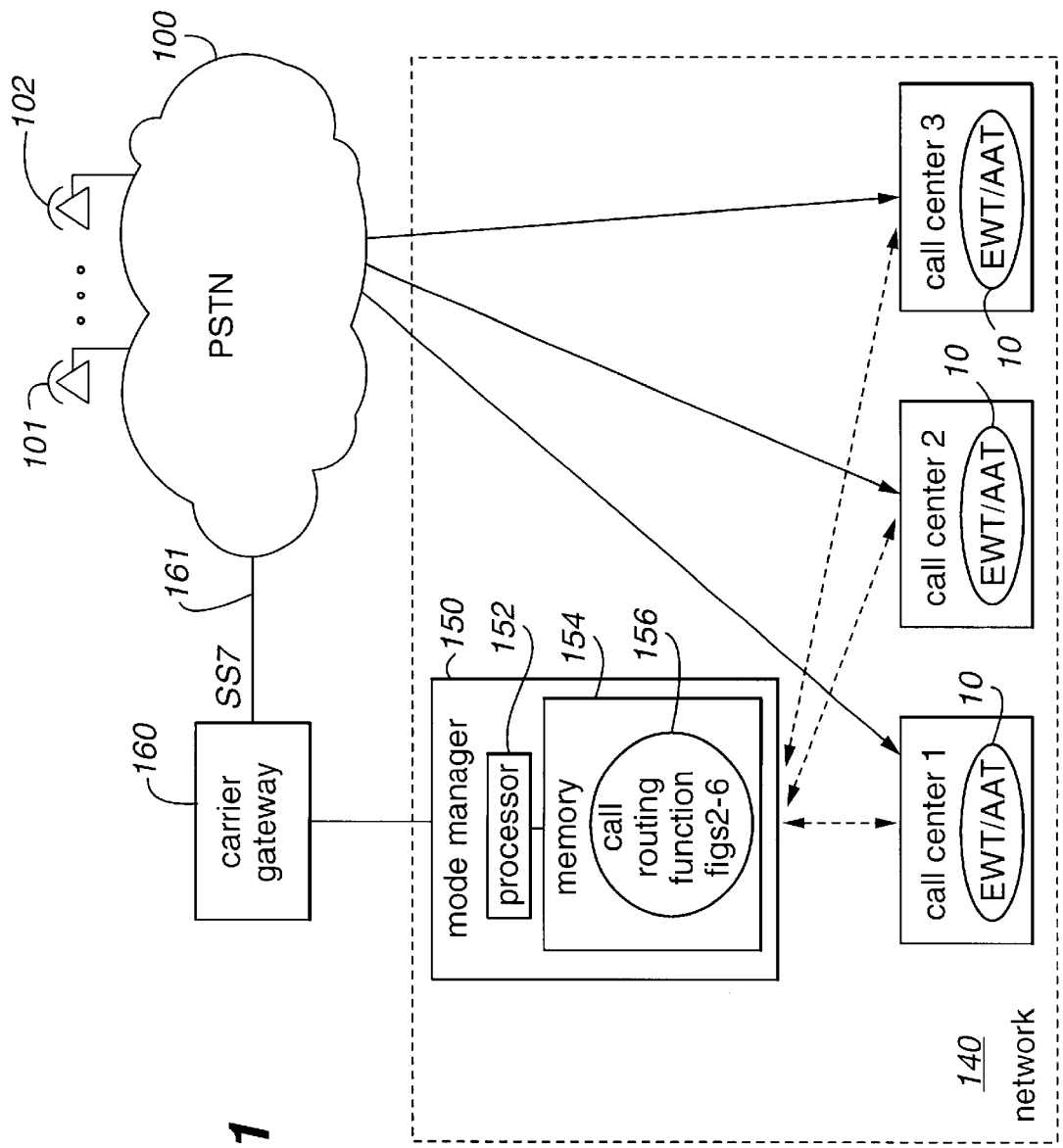
FIG. 1 is a block diagram of a telecommunications system that includes an illustrative embodiment of the invention.

FIG. 1 shows a conventional telecommunications system. In this illustrative example, a call-center network 140 comprises a plurality—three, in this example—of call centers 1–3 which form nodes in the network. Call centers 1–3 are interconnected with telephones 101–102 of callers who are potential users of call centers 1–3 via a public service telephone network (PSTN) 100. Calls from telephones 101–102 are distributed between call centers 1–3 by a node manager 150. Node manager 150 receives information about calls incoming to network 140 from a carrier gateway 160 which is connected to PSTN 100 via a Signaling System 7 network (SS7) 161. Call centers 1–3 send to manager 150 reports on their present status, and system 150 uses this information to route each call to the one of the call centers 1–3 where the call will be handled most expeditiously. Each call center comprises an automatic call distribution (ACD) switch, and a plurality of agent position terminals such as telephones. ACD switches connect the agent position terminals to PSTN 100. In each call center 1–3, the agents and their terminals are divided into one or more splits or skills, and the respective ACD switch defines a waiting-call queue for each of the splits or skills. Additionally, any one or more of the queues may comprise a plurality of priority queues, each for holding waiting calls of a different priority. Each call center 1–3 is illustratively the Avaya Definity® system executing the Avaya ACD and best split routing (BSR) software. As described, the telecommunications system of FIG. 1 is conventional.

Although FIG. 1 illustratively shows a telephone communication system, use of the invention is not confined to telephone systems. For example, call centers 1–3 may be customer care centers that handle communications in various media, and network 100 may be any suitable communications network, such as the Internet, for example. Also, gateway 160 and SS7 161 need not be used and manager 150 may communicate with network 100 directly.

According to the invention, each call center 1–3 executes an estimated wait time (EWT) and average advance time (AAT) function 10, and when polled by manager 150 reports the EWT and AAT to manager 150. EWT is an estimate of how long a last call enqueued in a call queue at a call center can expect to wait in the queue before being assigned to a call-center agent for servicing. AAT is the average amount of time that an enqueued call takes to advance one position in the call queue. EWT/AAT function 10 may be any suitable EWT and AAT computation function, but is preferably the function described in U.S. Pat. No. 5,506,898.

Node manger 150 is a stored-program-controlled machine, such as a computer, comprising a memory 154 or any other suitable storage for storing programs and data, and a processor 152 for executing programs from memory 154 and storing data in and using data from memory 154. According to the invention, included among programs and data stored in memory 154 is a call-routing function 156, two embodiments of which are shown in greater detail in FIGS. 2–3 and 4–6, respectively.

Figure 2:
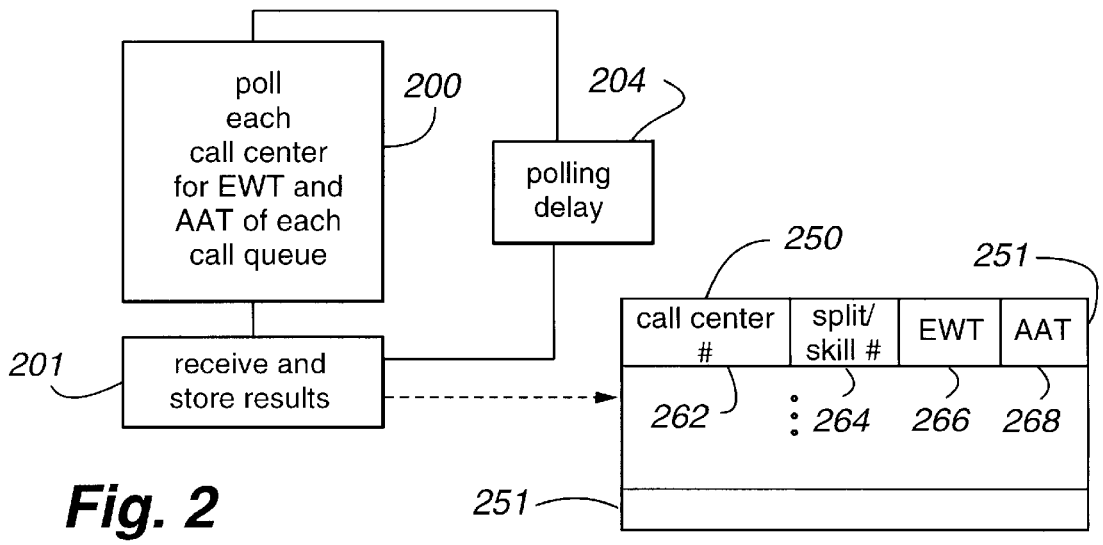
FIGS. 2–3 are a functional flow diagram of a first illustrative embodiment of a call-routing function of a node manager of the telecommunications system of FIG. 1.

In a first implementation, function 156 causes node manager 150 to periodically poll each call center 1–3 for EWT and AAT (actual or weighted) of each call queue, at step 200 of FIG. 2. When node manager 150 receives the results of a poll, function 156 stores them, at step 202. Illustratively, memory 154 includes a table 250 having a plurality of entries 251, one for each call queue. Each entry has a plurality of entries including an ID 262 of a call center 1–3 on which the call queue is situated, a split/skill ID 264 of the call queue's corresponding skill/split, and an EWT 266 and an AAT 268 of the call queue for storing the EWT and AAT values obtained at step 202. Following a polling delay, at step 204, node manager 150 again polls call centers 1–3, at step 200.

Figure 3:
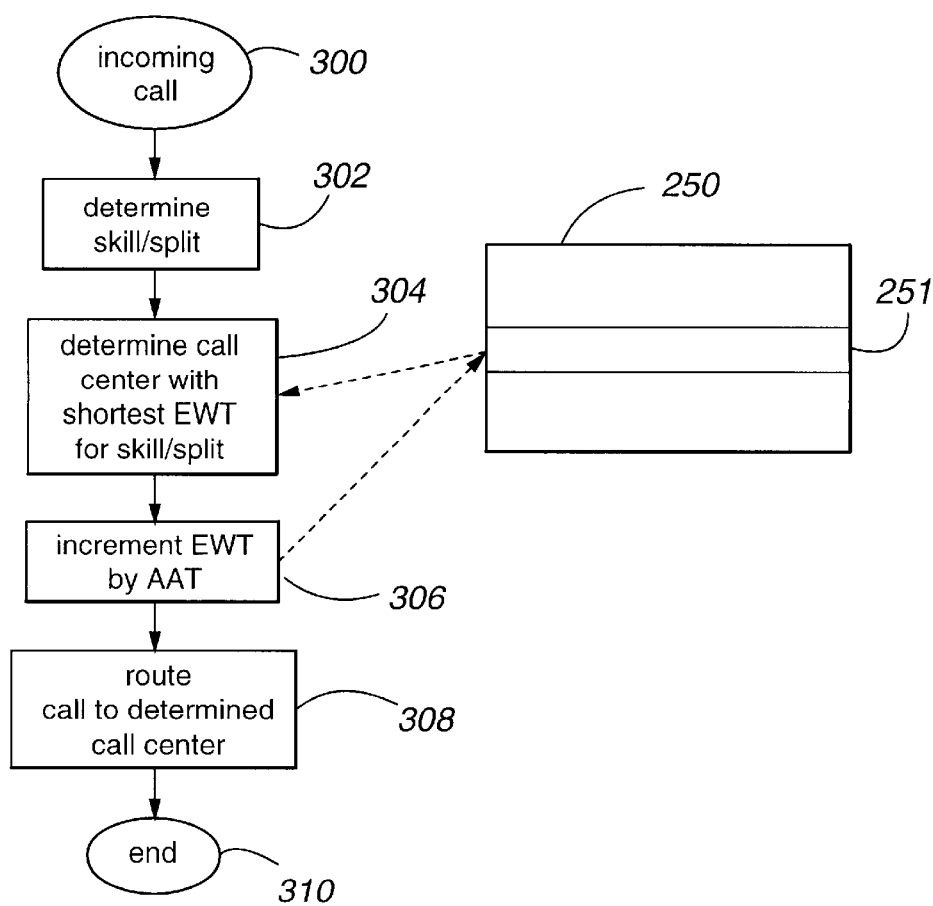

When node manager 150 learns that a call has arrived for network 140, at step 300 of FIG. 3, manager 150 determines which skill/split the call is destined for, at step 302, in a conventional manner. Function 156 examines fields 266 of entries 251 of table 250 that have the determined skill/split identified in their fields 264 to determine the one of the call centers 1–3 that has the shortest EWT for that skill/split, at step 304. Function 156 then increments the value of that skill/split's EWT 266 by the value of that skill/split's AAT 268, at step 306, and causes node manager 150 to route the call to the split/skill's call queue in the determined call center 1–3, at step 308, before ending execution at step 310. Thus, each time that a call is assigned to a skill/split's call queue in a call center 1–3, that split/skill's EWT is incremented by its AAT to reflect the effect that the call assignment has on the EWT. This is true even when the current value of the EWT that is being incremented is zero. This has the effect of distributing calls among call centers inversely proportionally to their AAT (e.g., in proportion to each call center's number of agents) in an agent surplus situation. For example if both of two call centers are in an agent surplus situation and one call center has half the AAT of (e.g., twice as many agents as) the other call center, the one call center will receive twice as many calls as the other call center during the agent surplus situation.

Figure 4:
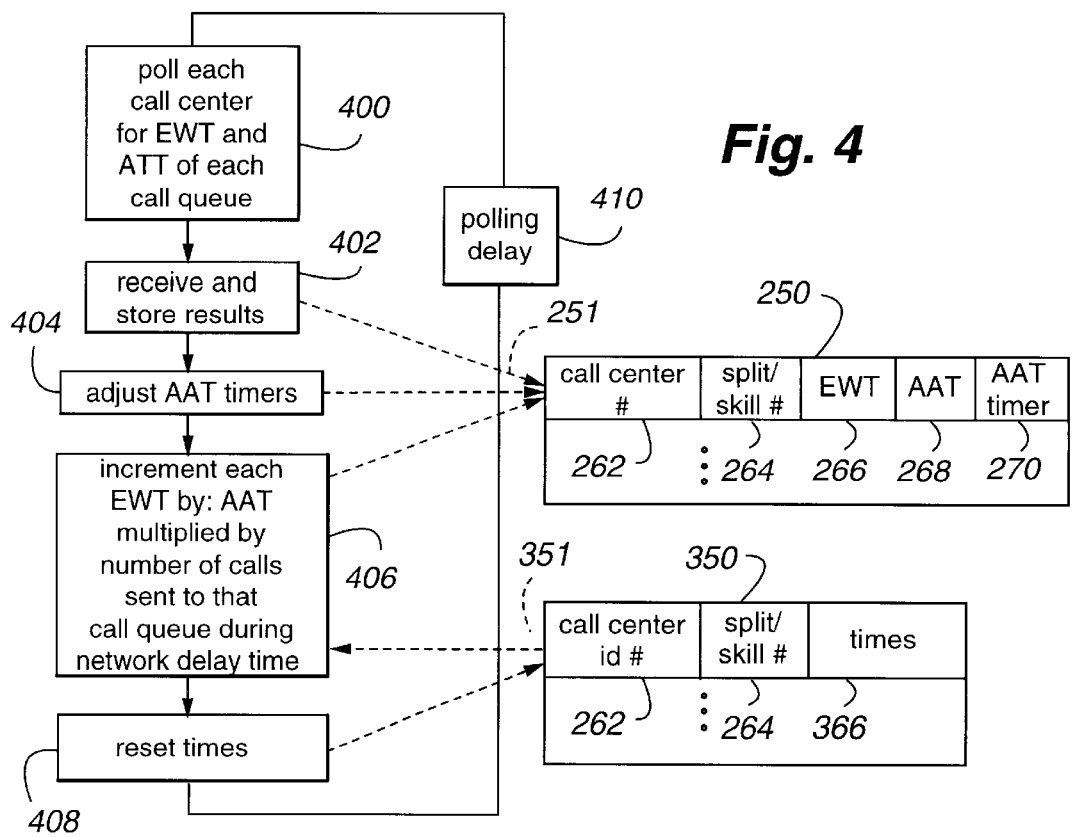
FIGS. 4–6 are a functional flow diagram of a second illustrative embodiment of the call-routing function of the node manager of the telecommunications system of FIG. 1.
Figure 5:
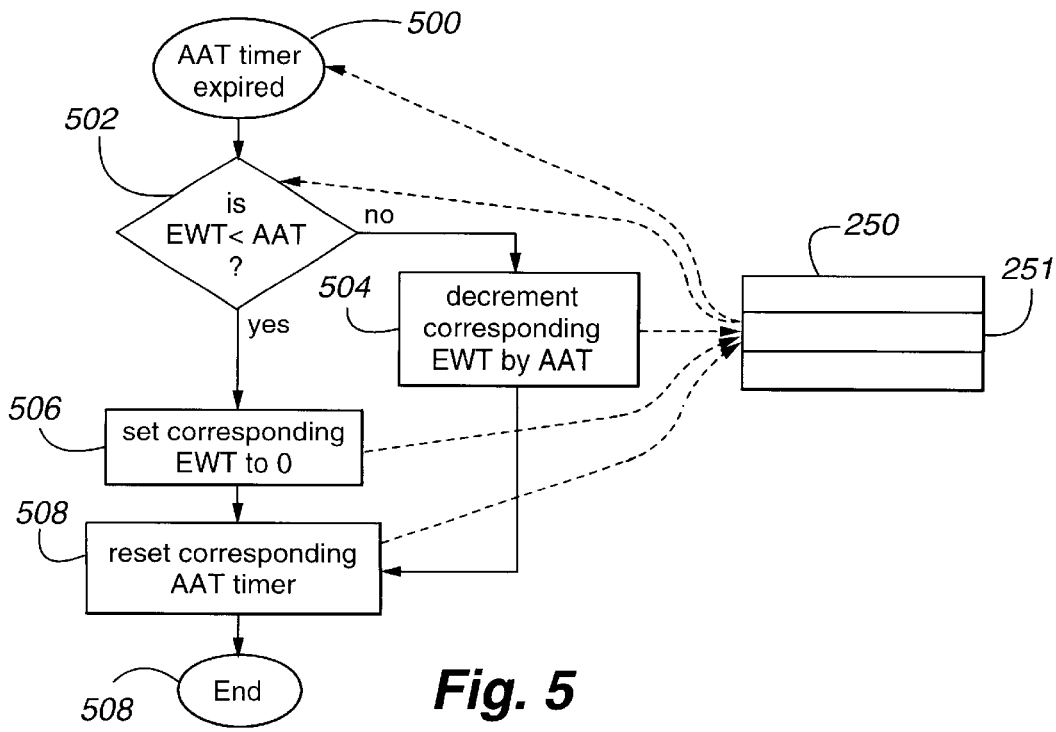

In a second implementation, function 156 causes node manager 150 to periodically poll each call center 1–3 for EWT and AAT of each call queue, at step 400 of FIG. 4, and stores the received results in the corresponding entries 251 of table 250, at step 402. Each entry 251 further includes an AAT timer 270 which is set to time the duration of the corresponding AAT 268, and function 156 adjusts AAT timer 270 to reflect the present value of AAT 268, at step 404. Timer 270 starts to count down the AAT automatically. Function 156 also increments each EWT 266 in table 250 by the number of calls that were routed to the corresponding call queue during the network delay time, at step 406. The network delay time is the amount of time that it took call center 1–3 to return a response to the poll to node manager 150. For performing step 406, function 156 illustratively uses a table 350 having a plurality of entries 351 each corresponding to a different call queue, like entries 251 of table 250. Each entry 251 has a plurality of fields including call center ID 261, a split/skill ID 264, and a "times" field 366 which contains the times at which calls were routed to the corresponding split/skill by node manager 150. At step 406, function 156 determines from "times" field 366 of an entry 351 how many calls were routed to the corresponding skill/split's call queue during the immediately preceding network delay time, multiplies that number by AAT 268 of the corresponding skill/split from table 250, and adds the result to the just-stored EWT 266 for that skill/split in table 250. Function 156 then clears "times" field 366 of the split/skill's entry 351 in table 350. Following a polling delay, at step 410, node manager 150 again polls call centers 1–3, at step 400.

Whenever, an AAT timer 270 of an entry 251 of table 250 expires, function 156 is alerted, at step 500. In response, function 156 decrements the value of EWT 266 of that entry 251 by the value of AAT 268 of that entry 251, at step 502, resets AAT timer 270 of that entry 251 to again time (count down) the AAT, at step 504, and ends execution, at step 506.

Figure 6:
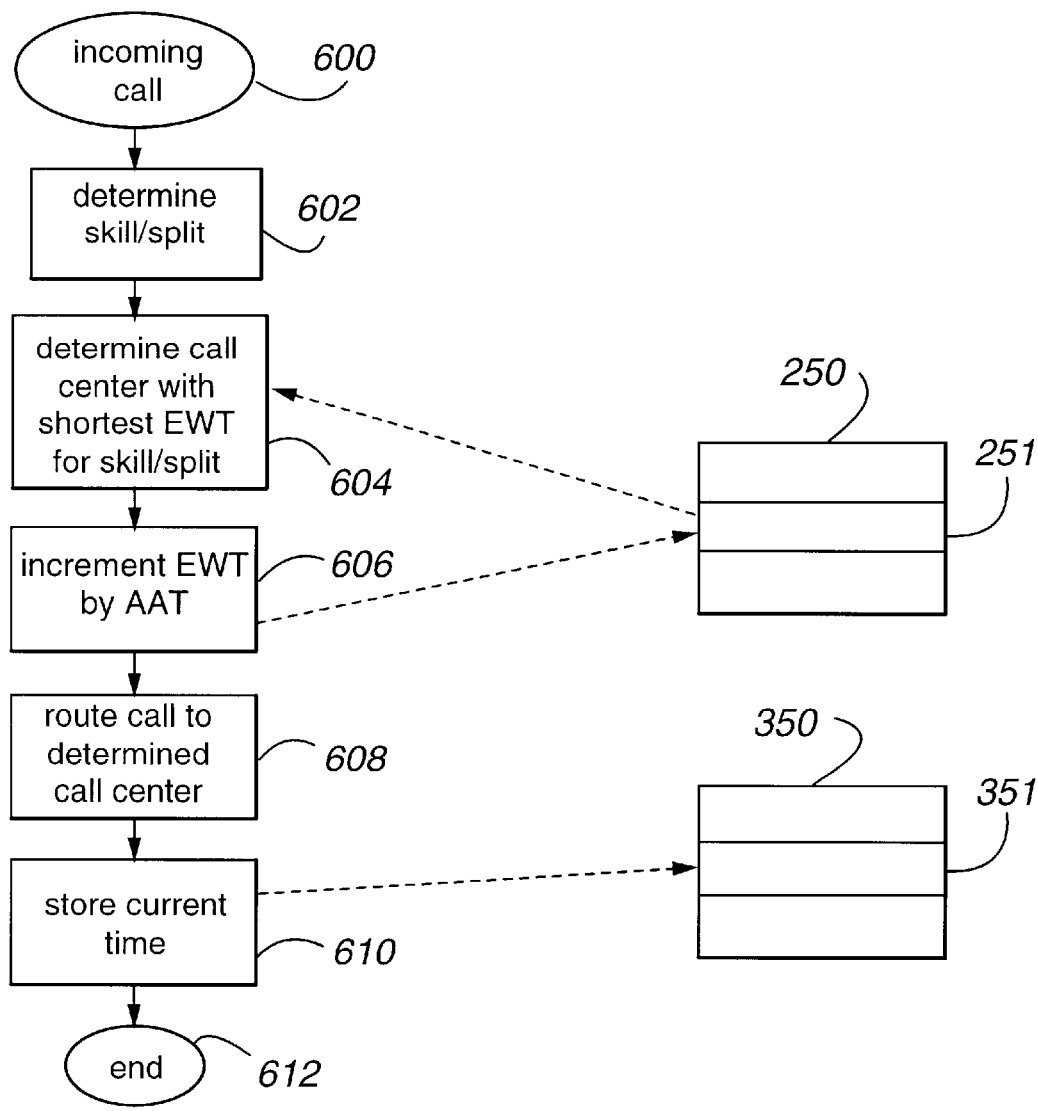

When node manager 150 learns that a call has arrived for network 140, at step 600 of FIG. 6, manager 150 determines which skill/split the call is destined for, at step 602, and determines from table 250 which call center 1–3 has the shortest EWT 266 for that split/skill, at step 604. Function 156 then increments that skill/split's EWT 266 by that skill/split's AAT 268 in table 250, at step 506, and causes node manager 150 to route the call to the determined call center, at step 608. Function 156 also enters the time at which it routed the call in "times" field 366 of entry 351 of table 350 that corresponds to the routed-to split/skill, at step 610, before ending execution at step 612.

Of course, various changes and modifications to the illustrative embodiment described above will be apparent to those skilled in the art. For example, use of the invention is not limited to communications queues in customer contact centers, but may be used with any plurality of work queues for work items of any kind. These changes and modifications can be made without departing from the spirit and the scope of the invention and without diminishing its attendant advantages. It is therefore intended that such changes and modifications be covered by the following claims.

What is claimed is:

1. A method of managing a plurality of work queues comprising:

for each of a plurality of work queues, obtaining an expected wait time (EWT) and an average advance time (AAT) for the work queue;

for each of the plurality of work queues, upon each expiration of the AAT for the work queue, decrementing the EWT for the work queue by the AAT for the work queue;

causing a work item to be enqueued in one of the work queues that presently has a lowest said EWT; and in response to the causing, incrementing the EWT for the one work queue by the AAT for the one work queue.

2. The method of claim 1 wherein:

obtaining comprises
periodically obtaining the EWT and AAT for each work queue, and
for each work queue, storing the periodically-obtained EWT and AAT for the work queue in place of any previously stored EWT and AAT for the work queue;

decrementing comprises
for each work queue, upon each expiration of presently-stored said AAT for the work queue, decrementing presently-stored said EWT for the work queue by the presently-stored AAT for the work queue;

causing comprises
causing the work item to be enqueued in the one of the work queues that has a lowest said presently-stored EWT; and incrementing comprises
incrementing the presently-stored EWT for the one work queue by the presently-stored AAT for the one work queue.

3. The method of claim 1 wherein:

the obtaining is periodically repeated for each of the plurality of work queues.

4. The method of claim 3 wherein:

the causing to be enqueued is effected in response to arrival of the work item for processing.

5. The method of claim 1 wherein:

each work queue is a call queue in a different one of a plurality of call centers.

6. The method of claim 1 wherein:

the obtaining comprises
for each work queue, receiving a sent EWT for the work queue;
for each work queue, incrementing the received EWT for the work queue by a product of the AAT for the work queue and a number of work items caused to be enqueued in the work queue since the received EWT for the work queue was sent, to obtain the EWT for the work queue.

7. A method of managing a plurality of call centers comprising:

for each call queue of each call center, periodically obtaining from the call center an expected wait time (EWT) and an average advance time (AAT) for calls in the call queue;

storing the obtained EWT and AAT for the call queue in place of any previously-stored EWT and AAT for the call queue;

for each call queue of each call center, upon each expiration of the stored AAT for the call queue, decrementing the stored EWT for the call queue by the stored AAT for the call queue;

in response to arrival of a call, determining suitable ones of the call queues for the arrived call in a plurality of the call centers;

determining one of the suitable call queues that presently has a lowest stored EWT for the call queue;

routing the call to the call center that has the one suitable call queue; and in response to the routing, incrementing the stored EWT for the one suitable call queue by the AAT for the one suitable call queue.

8. The method of claim 7 wherein:

the routing comprises
causing the call to be enqueued in the one suitable call queue.

9. The method of claim 8 wherein:

periodically obtaining and storing comprises
for each call queue of each call center, receiving the EWT and the AAT for the call queue that were sent by the call center that has the call queue,
for each call queue, incrementing the received EWT of the call queue by a product of the received AAT for the call queue and a number of calls that were caused to be enqueued in the call queue since the call center sent the received EWT, and
for each call queue, storing the incremented EWT and the received AAT for the call queue in place of any previously-stored EWT and AAT for the call queue.

10. An apparatus for performing the method of one of claims 1–9.

11. A routing apparatus comprising:

a communications device that obtains an expected wait time (EWT) and an average advance time (AAT) for each of a plurality of work queues;

a determinator of present EWTs that responds to each expiration of the AAT for any work queue by decrementing the EWT for that work queue by the AAT for that work queue; and a router that routes a work item to one of the work queues that presently has a lowest said EWT; wherein the determinator responds to the routing by incrementing the EWT for the one work queue by the AAT for the one work queue.

12. The routing apparatus of claim 11 wherein:

the communications device periodically obtains the EWT and the AAT anew for each of the work queues.

13. The routing apparatus of claim 11 wherein:

the router routes the work item to the one work queue in response to arrival of the work item for processing.

14. The routing apparatus of claim 11 wherein:

each work queue is a call queue in a different one of a plurality of call centers.

15. The routing apparatus of claim 11 wherein:

the communications device receives a sent EWT for each work queue; and the determinator responds to receipt of an EWT for any work queue by incrementing the EWT for that work queue by a product of the AAT for that work queue and a number of work items that the router routed to the work queue since the received EWT for that work queue was sent, to obtain the EWT for that work queue.

16. A network call router comprising:

a storage medium;

a communications device that periodically obtains an expected call wait time (EWT) and an average call advance time (AAT) for each call queue from a plurality of call centers;

a determinator of present EWTs that stores the obtained EWT and AAT for each call queue in the storage medium in place of any EWT and AAT that were previously stored for that call queue in the store, and that responds to each expiration of the stored AAT for any call queue by decrementing the stored EWT for that call queue by the stored AAT for that call queue;

a router that responds to arrival of a call by determining suitable ones of the call queues for the arrived call in a plurality of the call centers, determines one of the suitable call queues that presently has a lowest stored EWT for the call queue, and routes the call to the call center that has the one suitable call queue; and wherein the determinator responds to the routing by incrementing the stored EWT for the one suitable call queue by the stored AAT for the one suitable call queue.

17. The network call router of claim 16 wherein:

the determinator increments the EWT that is obtained by the communications device for each call queue by a product of the AAT for that call queue and a number of calls that were routed to that call queue since the call center sent the obtained EWT for that call queue, and stores the obtained AAT and the incremented EWT for the call queue in the storage medium in place of any EWT and AAT for that call queue that were previously stored for that call queue in the storage medium.

18. A routing apparatus comprising:

means for obtaining, for each of a plurality of work queues, an expected wait time (EWT) and an average advance time (AAT) for the work queue;

means for decrementing, for each of the plurality of work queues upon each expiration of the AAT for the work queue, the EWT for the work queue by the AAT for the work queue;

means for causing a work item to be enqueued in one of the work queues that presently has a lowest said EWT; and means for incrementing, in response to the causing, the EWT for the one work queue by the AAT for the one work queue.

19. The routing apparatus of claim 18 wherein:

the means for obtaining comprises means for receiving, for each work queue, a sent EWT for the work queue; and means for incrementing, for each work queue, the received EWT for the work queue by a product of the AAT for the work queue and a number of work items caused to be enqueued in the work queue since the received EWT for the work queue was sent, to obtain the EWT for the work queue.

20. A computer-readable medium containing instructions which, when executed in a computer, cause the computer to perform the method of one of claims 1–9.

* * * * *